United States Patent
Ginzburg et al.

(10) Patent No.: US 7,653,119 B2
(45) Date of Patent: Jan. 26, 2010

(54) EXTENDING ORTHOGONAL FREQUENCY DIVISION MULTIPLEXED WIRELESS LOCAL AREA NETWORKS USING DIRECT SEQUENCE SPREAD SPECTRUM/COMPLEMENTARY CODE KEYING

(75) Inventors: Boris E. Ginzburg, Haifa (IL); Shay E. Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 10/740,353

(22) Filed: Dec. 18, 2003

(65) Prior Publication Data

US 2005/0135459 A1 Jun. 23, 2005

(51) Int. Cl.
  *H04B 1/00* (2006.01)
(52) U.S. Cl. ............... 375/140; 340/5.61; 340/5.64; 340/825.72; 370/320; 375/130; 375/E1.001
(58) Field of Classification Search .............. 342/357; 370/329, 338, 445, 447, 468, 462, 348; 375/140, 375/377
  See application file for complete search history.

(56) References Cited

U.S. PATENT DOCUMENTS

2002/0097182 A1* 7/2002 Goren et al. ........... 342/357.07
2002/0110105 A1* 8/2002 Awater et al. ............... 370/338
2003/0133469 A1* 7/2003 Brockmann et al. ......... 370/445
2003/0169763 A1* 9/2003 Choi et al. .................. 370/462
2003/0185169 A1* 10/2003 Higgins ...................... 370/329

OTHER PUBLICATIONS

"A Detailed Examination of the Environmental and Protocol Parameters that Affect 802.11g Network Performance". White Paper, Proxim Corporation. Jun. 2003.
"Alphabet Soup: Tradeoffs Between 802.11b, 802.11a, and 802.11g". Jim Lansford, Wade Gillham; Mobilian Corporation. Apr. 2, 2002.
"IEEE 802.11g Explained". Jim Zyren; Intersil Corporation. Dec. 6, 2001.
"Press Release—Atheros Fourth-Generation WLAN Chipsets Double the Range of Wi-Fi and Reduce Power Consumption by 60 Percent". Atheros Communications. http://www.atheros.com/news/AR5004.html. Sep. 15, 2003.

* cited by examiner

*Primary Examiner*—David C Payne
*Assistant Examiner*—Adolf Dsouza
(74) *Attorney, Agent, or Firm*—Trop, Pruner & Hu, P.C.

(57) ABSTRACT

In various embodiments, the present invention includes a method for direct spread modulating data for wireless transmission at a 5 Gigahertz band or other frequency bands via wireless devices. Such wireless transmissions may occur in a wireless network having protection mechanisms to allow such wireless devices to co-exist with other devices not capable of such modulation.

11 Claims, 3 Drawing Sheets

EXTENDING ORTHOGONAL FREQUENCY DIVISION MULTIPLEXED WIRELESS LOCAL AREA NETWORKS USING DIRECT SEQUENCE SPREAD SPECTRUM/COMPLEMENTARY CODE KEYING

BACKGROUND

Wireless communication systems, such as a wireless local area network (WLAN), and the like, are becoming increasingly prevalent in homes, businesses, and public facilities. Certain WLANs may conform to the Institute of Electrical and Electronic Engineers (IEEE) 802.11b standard, IEEE std. 802.11b-1999 (published Sep. 16, 1999) (also known as "WiFi"), IEEE std. 802.11a-1999 (published Sep. 16, 1999), and IEEE std. 802.11g (published April 2003).

While 802.11a transmissions can achieve raw data rates of up to 54 Megabits per second (Mbps) for short distances, such devices have a range of only about 100 meters, and transmit using orthogonal frequency division multiplex (OFDM) carriers (i.e., a multi-carrier system). These transmissions occur at a frequency of around 5 Gigahertz (GHz); more technically, the 5 GHz "band" includes several bands extending from approximately 4.9 GHz to 5.9 GHz, where many independent channels are available In contrast, 802.11b/g devices can transmit data with a range of about 300 meters (using a 80 Megahertz (MHz) frequency band located at approximately 2.4 GHz); however, only 3 independent channels are available. A need thus exists to extend the range of WLANs operating at higher frequencies (i.e., the 5 GHz band), where many independent channels are available.

DETAILED DESCRIPTION

In various embodiments, 802.11a WLANs and devices thereof may be extended to include transmission of data using direct sequence spread spectrum/complementary code key (DSSS/CCK) modulation in a 5 GHz band. As used herein, the term "DSSS" or "direct spread" means direct sequence spread spectrum communications, and includes complementary code key (CCK) modulated transmissions, as an example. In such manner, a greater range may be achieved in such networks and devices. While certain embodiments are discussed herein as using CCK modulation, the scope of the present invention is not so limited, and other embodiments may extend such devices using other non-OFDM modulation schemes. Further, while discussed herein as operating at a 5 GHz band, the scope of the present invention is not so limited, and other embodiments may transmit data at other frequencies.

If all devices in a WLAN in accordance with one embodiment of the present invention are operating using DSSS/CCK modulation (i.e., all devices are CCK-compatible), an access point and wireless stations may all co-exist in the network with minimal collision probability. However, if certain stations in a WLAN operating at a 5 GHz band operate using DSSS/CCK modulation (or OFDM modulation), while other devices (e.g., legacy devices) can only operate using OFDM modulation, collisions become more probable.

Thus in various embodiments in which legacy devices and devices in accordance with an embodiment of the present invention (also termed "extended 802.11a devices" herein) are present, certain protection mechanisms may be provided. Such protection mechanisms may aid in allowing the coexistence of legacy 802.11a devices and extended 802.11a devices with minimal collision probability.

Such protection mechanisms may vary, but in certain embodiments may include a physical carrier sense mechanism, protection based on energy detection, or virtual carrier sense based on network allocation vector (NAV) protection.

For example, a WLAN in accordance with an embodiment of the present invention may include legacy devices conforming to the 802.11a standard and extended 802.11a wireless devices. Such a mixed basic service set (BSS) system may desirably include protection mechanisms. In one such embodiment, downstream protection (i.e., from a wireless access point to one or more stations in the WLAN) may be performed.

Figure 1:
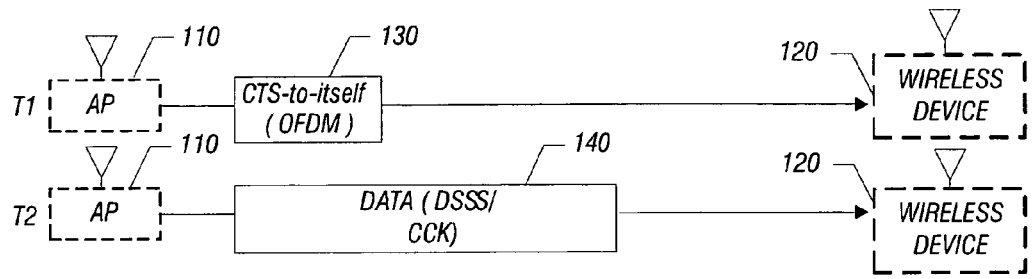
FIG. 1 is a timing diagram of downstream protection in accordance with one embodiment of the present invention.

Referring now to FIG. 1, shown is a timing diagram of downstream protection in accordance with one embodiment of the present invention. While shown in FIG. 1 as including a single access point 110 and a single wireless device 120, it is to be understood that in various embodiments, a WLAN may include multiple access points and multiple wireless devices. Further, while not shown in FIG. 1, it is to be understood that access point 110 may be coupled to a local area network (LAN), such as a corporate network for example. In turn the LAN may be coupled via a firewall to the Internet, for example. Alternatively, access point 110 may be a hot spot located at a public or private facility, such as an airport, restaurant, hotel, business and the like.

As shown in FIG. 1, at a time T1, access point 110 first transmits a protection packet 130, which is received by wireless device 120. In one embodiment, protection packet 130 may be a clear-to-send (CTS) packet, and more specifically may be a CTS packet that is a "CTS-to-itself" packet in which both a source address and a destination address is that of access point 110. Its duration field may protect the following DSSS/CCK data frame. In the embodiment of FIG. 1, protection packet 130 may be sent in an OFDM mode such that all stations within the WLAN may receive the packet and update their virtual carrier sense counter NAV accordingly.

Next, at a later time T2, access point 110 transmits a data packet 140 in DSSS/CCK mode to wireless device 120. In such manner, transmissions from other wireless devices in the WLAN, including legacy devices, may be prevented during downstream transmission of DSSS/CCK data.

Figure 2:
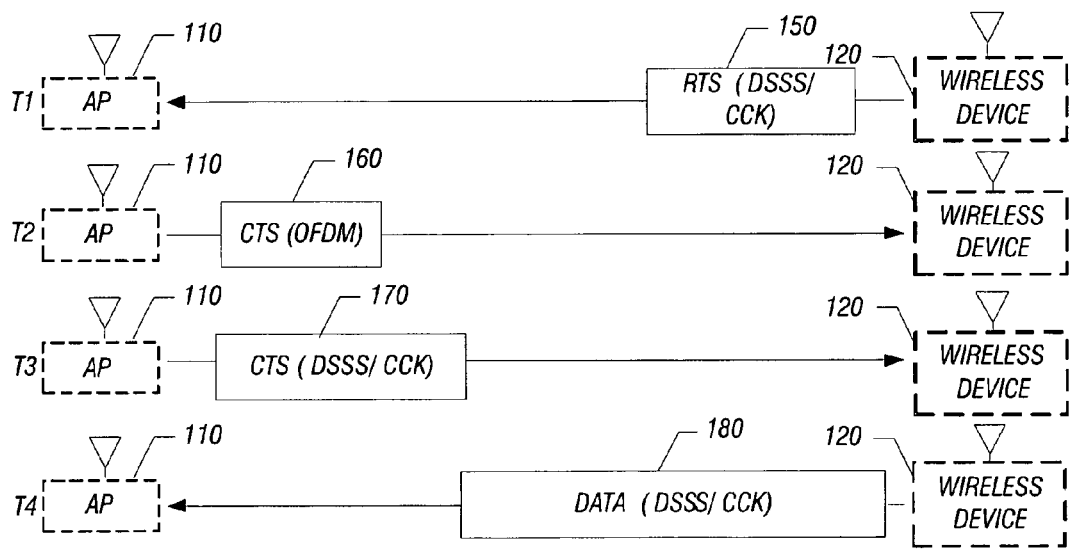
FIG. 2 is a timing diagram of upstream protection in accordance with one embodiment of the present invention.

In various embodiments, upstream protection (i.e., from a wireless station to an access point) may also be performed. Referring now to FIG. 2, shown is a timing diagram of upstream protection in accordance with one embodiment of the present invention. As shown in FIG. 2, at a first time T1, a wireless device 120 sends a protection packet to access point 110. In one embodiment, protection packet 150 may be a request-to-send (RTS) packet sent using DSSS/CCK mode. Upon receipt of this packet, access point 110 transmits two different carrier sense packets, namely a first CTS packet 160 in OFDM mode and a second CTS packet 170 in DSSS/CCK mode (at times T2 and T3, respectively). While shown in FIG.

2 as being sent in a particular order, it is to be understood that the scope of the present invention is not so limited.

First CTS packet 160 may protect both second CTS packet 170 and a later data frame. That is, CTS packet 160 may be used to prevent legacy devices from transmitting information, while second CTS packet 170 may be received at wireless device 120 to enable transmission of a data packet 180 to access point 110. Thus, as shown in FIG. 2, data packet 180 may be transmitted in DSSS/CCK mode.

Embodiments of the present invention may be used to transmit beacons, broadcast and multi-cast data (generically "casting data") to legacy devices and extended 802.11a devices that are within the WLAN. Broadcast data may be sent to all stations within a WLAN (i.e., "one to all" transmission), while multi-cast data may be sent to a group of stations having the same multi-cast address (i.e., "one to many" transmission).

Figure 3:
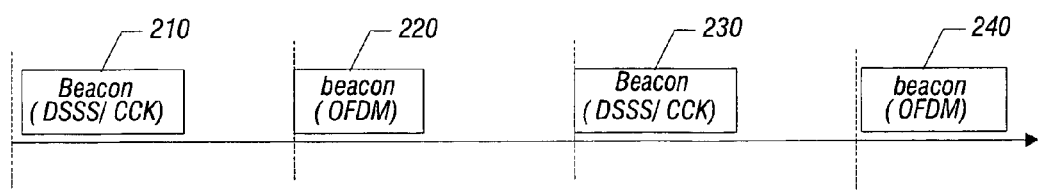
FIG. 3 is a timing diagram of beacon operation in accordance with one embodiment of the present invention.

Referring now to FIG. 3, shown is a timing diagram of a double beacon system in accordance with one embodiment of the present invention. As shown in FIG. 3, a first beacon 210 may be sent using a DSSS/CCK mode, then a second beacon 220 may be sent in OFDM mode. These beacons may include information regarding the timing and synchronization of the network, as well as the capabilities of an access point thereof. Similarly, a third beacon 230 and a fourth beacon 240 may be sent with the same alternating modes (i.e., DSSS/CCK and OFDM). While shown in FIG. 3 as proceeding from a DSSS/CCK mode to an OFDM mode, it is to be understood that in other embodiments, a first beacon may be an OFDM mode beacon and a second beacon may be a DSSS/CCK mode beacon. In one embodiment, the beacons may be separated by intervals of 100 milliseconds (ms), although the scope of the present invention is not so limited. In certain embodiments, the beacon period (which may be declared within the beacon) may be 200 ms, although the scope of the present invention is not so limited. In other embodiments, beacons may be sent one after another. While not shown in FIG. 3, it is to be understood that data packets of a similarly alternating modulation may be sent between the beacons.

Figure 4:
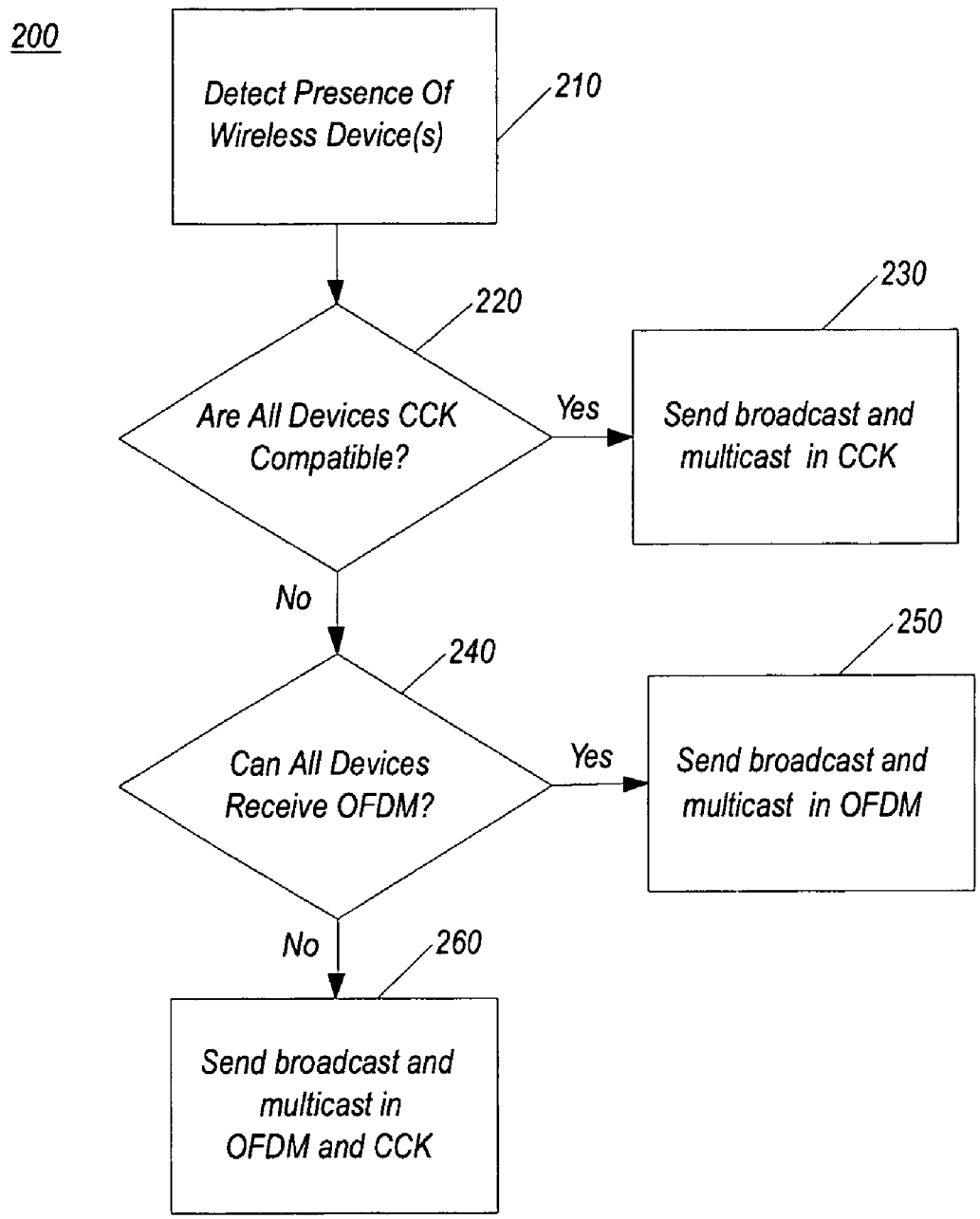
FIG. 4 is a flow diagram of a casting method in accordance with one embodiment of the present invention.

Referring now to FIG. 4, shown is a flow diagram of a casting method (i.e., broadcasting and/or multi-casting) in accordance with one embodiment of the present invention. As shown in FIG. 4, method 200 may begin by detecting the presence of one or more wireless devices within a WLAN (block 210). Next it may be determined whether all of the devices are DSSS/CCK-compatible (diamond 220). If so, the casting data may be sent in DSSS/CCK mode (block 230). That is, casting data may be sent one time only in DSSS/CCK mode.

Alternately, if not all devices are DSSS/CCK-compatible, it is next determined whether all devices are capable of receiving OFDM mode transmissions (diamond 240). If all such devices are capable of receiving OFDM mode transmissions, the casting data may be sent in OFDM mode (block 250). That is, the casting data may be sent one time in OFDM mode only.

Alternately, if not all devices are capable of receiving OFDM mode transmissions, (for example, if legacy devices are present, or wireless devices are too far from an access point to receive OFDM mode transmissions), casting data may be sent in both OFDM mode and DSSS/CCK mode (block 260). Thus in certain embodiments, modulation of the casting data may be dynamically selected by an access point depending on the type of devices present in a network and data rate(s) they are able to support.

In various embodiments, the casting data may be multicast data or may be broadcast data. Further, a similar method may be performed when one or more stations are in a power save (PS) mode.

Embodiments may be implemented in a computer program. As such, these embodiments may be stored on a storage medium having stored thereon instructions which can be used to program a computer system, access point, wireless station or the like to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

Figure 5:
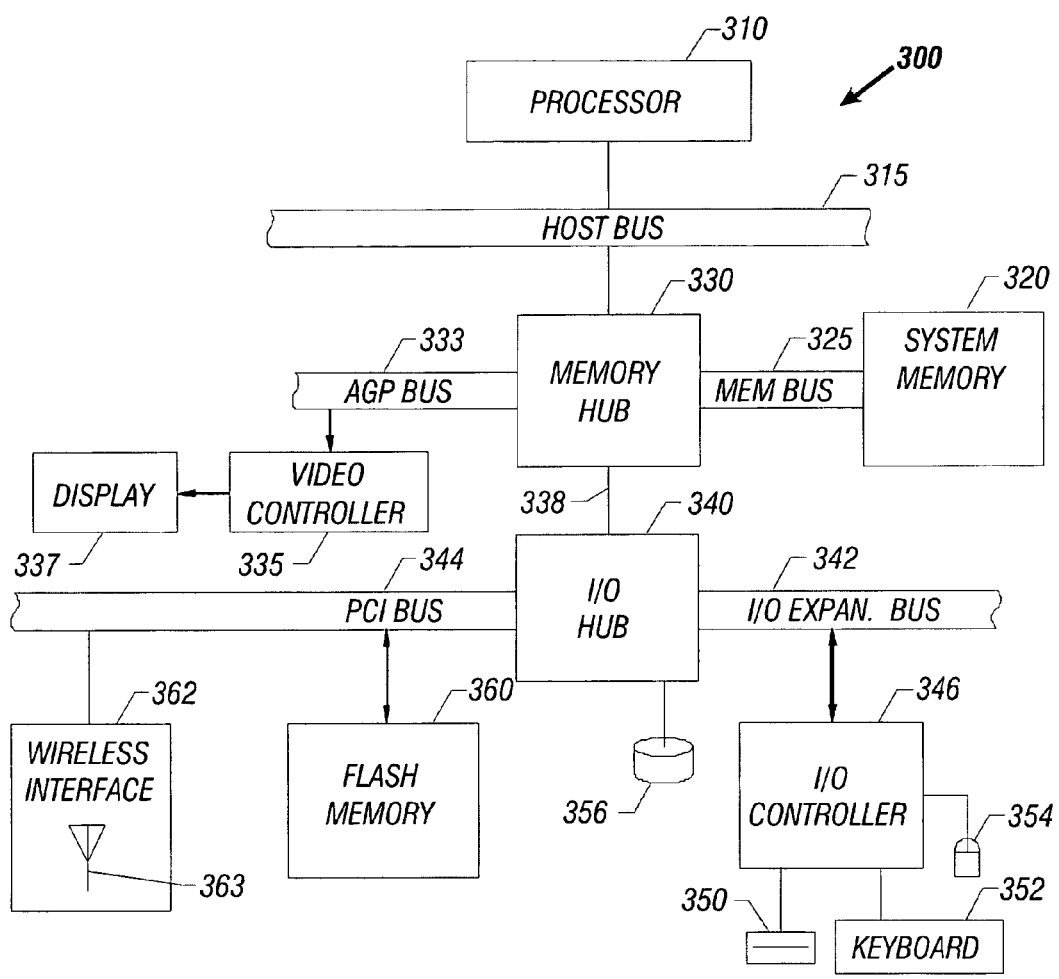
FIG. 5 is a block diagram of a representative data processing system with which embodiments of the invention may be used.

FIG. 5 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, application specific integrated circuit (ASIC), a programmable gate array (PGA), and the like.

The processor 310 may be coupled over a host bus 315 to a memory hub 330 in one embodiment, which may be coupled to a system memory 320 via a memory bus 325. In various embodiments, system memory 320 may be synchronous dynamic random access memory (SDRAM), static random access memory (SRAM), double data rate (DDR) memory and the like. The memory hub 330 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 330 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated in June 1995, or alternately a bus such as the PCI Express bus, or another third generation I/O interconnect bus. The I/O expansion bus 342 may be coupled to an I/O controller 346 that controls access to one or more I/O devices. As shown in FIG. 5, these devices may include in one embodiment storage devices, such as a floppy disk drive 350 and input devices, such as keyboard 352 and mouse 354. The I/O hub 340 may also be coupled to, for example, a hard disk drive 356 as shown in FIG. 5. It is to be understood that other storage media may also be included in the system. In an alternate embodiment, the I/O controller 346 may be integrated into the I/O hub 340, as may other control functions.

The PCI bus 344 may be coupled to various components including, for example, a flash memory 360. Further shown in FIG. 5 is a wireless interface 362 coupled to the PCI bus 344, which may be used in certain embodiments to communicate with remote devices and/or devices in a WLAN, such as an access point or other wireless stations. As shown in FIG. 5, wireless interface 362 may include a dipole or other antenna 363 (along with other components not shown in FIG. 5). While such a wireless interface may vary in different embodiments, in certain embodiments the interface may be used to communicate via data packets with a wireless wide area network (WWAN), WLAN, a BLUETOOTH™, ultrawideband (which may be a multiband OFDM (MB-OFDM) network or a direct sequence code division multiple access (DS-CDMA) network), a wireless personal area network (WPAN), or another wireless protocol. For example, wireless interface 362 may include circuitry to communicate using 802.11a/b/g protocols, for example. In various embodiments, wireless interface 362 may be coupled to system 300, which may be a notebook personal computer, via an external add-in card, or an embedded device. In other embodiments wireless interface 362 may be fully integrated into a chipset of system 300.

Although the description makes reference to specific components of the system 300, it is contemplated that numerous modifications and variations of the described and illustrated embodiments may be possible. More so, while FIG. 5 shows a block diagram of a system such as a notebook personal computer, it is to be understood that embodiments of the present invention may be implemented in another wireless device such as a cellular phone, PDA or the like. In such embodiments, a flash memory in accordance with an embodiment may be coupled to an internal bus which is in turn coupled to a microprocessor and a peripheral bus, which may in turn be coupled to a wireless interface and an associated antenna such as a dipole antenna, helical antenna, global system for mobile communication (GSM) antenna, and the like.

In certain embodiments, extended 802.11a implementations may include the following advantages over other wireless operation: more channels than 802.11b/g since there is 80 MHz available in the 2.4 GHz band and 300 MHz in the 5 GHz band; and better coverage and longer range than 802.11a because of better sensitivity. That is, in embodiments of the present invention, the better range of 802.11g may be achieved with a wider bandwidth. Additionally, certain embodiments may have better sensitivity and a higher throughput than 802.11a operation, particularly when a station is farther from an access point.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
at least one storage device to store code to transmit a first protection signal using orthogonal frequency division multiplexing, the first protection signal corresponding to a clear-to-send packet having a source address and a destination address corresponding to the apparatus, then transmit a second protection signal having direct spread modulation prior to transmission of a first data frame from a direct spread-compatible wireless device, wherein the apparatus is an access point, and thereafter wirelessly transmit the first data frame at a 5 Gigahertz band using non-orthogonal frequency division multiplexing, wherein the first protection signal may be received by wireless stations only capable of orthogonal frequency division multiplexing communication, and the data is only received by wireless stations capable of non-orthogonal frequency division multiplexing communication, the second protection signal to enable direct spread transmission of the first data frame from the direct spread-compatible wireless device, wherein the first protection signal is to prevent transmission from the orthogonal frequency division multiplexing-capable wireless stations during the wireless data transmission.

2. The apparatus of claim 1, wherein the first protection signal is to enable the 802.11a wireless stations to update a virtual carrier sense counter network allocation vector.

3. A system comprising:
a flash memory to store code to transmit a first protection signal using orthogonal frequency division multiplexing, the first protection signal corresponding to a clear-to-send packet having a source address and a destination address corresponding to the system, then transmit a second protection signal having direct spread modulation prior to transmission of a first data frame from a direct spread-compatible wireless device, and thereafter wirelessly transmit the first data frame at a 5 Gigahertz band using non-orthogonal frequency division multiplexing, wherein the first protection signal may be received by wireless stations only capable of orthogonal frequency division multiplexing communication, the second protection signal to enable direct spread transmission of the first data frame from the direct spread-compatible wireless device, and the data is only received by wireless stations capable of non-orthogonal frequency division multiplexing communication; and
a wireless interface coupled to the flash memory to transmit the data.

4. The system of claim 3, wherein the system comprises an access point.

5. The system of claim 3, wherein the system comprises a mobile device able to also wirelessly transmit data at the 5 Gigahertz band using orthogonal frequency division multiplexing.

6. A system comprising:
a processor;
a memory coupled to the processor including instructions that enable the system to first transmit a first protection signal in a non-direct spread modulation scheme corresponding to orthogonal frequency division multiplexing, and second transmit a second protection signal having direct spread modulation from an access point in an orthogonal frequency division multiplexed-based wireless network prior to transmission of a first data frame from a direct spread-compatible wireless device, the first protection signal to prevent legacy 802.11a wireless devices in the orthogonal frequency division multiplexed-based wireless network from transmitting during the second protection signal and during the first data frame and the second protection signal to enable direct spread transmission of the first data frame from the direct spread-compatible wireless device, and wherein the first protection signal is a clear-to-send signal having a destination address corresponding to a source address of the access point.

7. The system of claim 6, wherein the system comprises an access point.

8. The system of claim 7, wherein the system is to transmit beacons having an alternating pattern of direct spread modulation beacons and non-direct spread modulation beacons.

9. The system of claim 8, wherein the system is to transmit data packets having the alternating pattern between the beacons.

10. The system of claim 6, wherein the direct spread transmission is at a 5 Gigahertz band.

11. The system of claim 6, wherein the first protection signal is responsive to a request signal from the direct spread-compatible wireless device.

* * * * *

UNITED STATES PATENT AND TRADEMARK OFFICE
CERTIFICATE OF CORRECTION

PATENT NO.       : 7,653,119 B2  
APPLICATION NO.  : 10/740353  
DATED            : January 26, 2010  
INVENTOR(S)      : Ginzburg et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Twenty-eighth Day of December, 2010

David J. Kappos
*Director of the United States Patent and Trademark Office*